Figure 1:
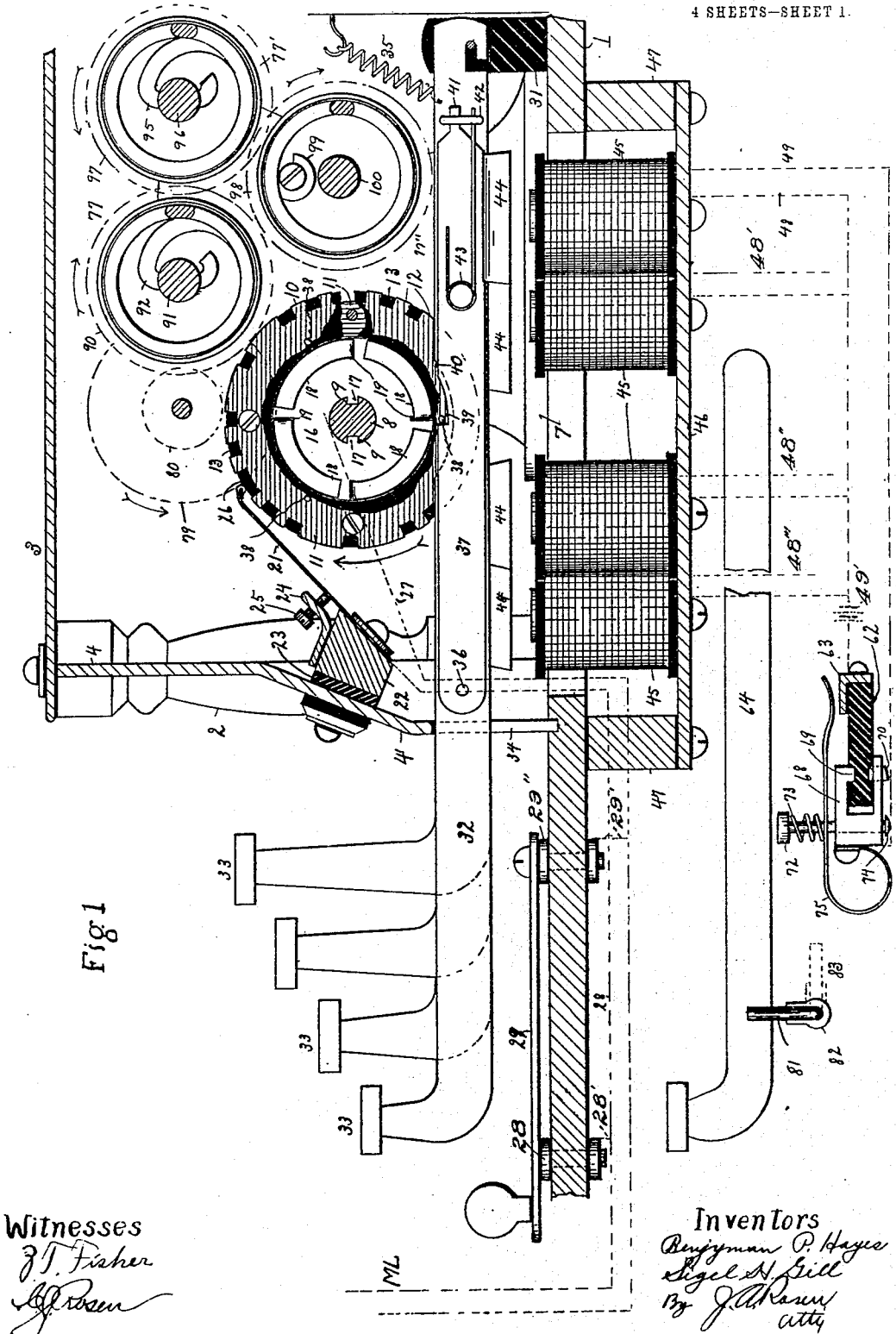

No. 808,366. PATENTED DEC. 26, 1905.
B. P. HAYES & S. H. GILL.
TELEGRAPH TRANSMITTER.
APPLICATION FILED JUNE 17, 1905.
4 SHEETS—SHEET 3.
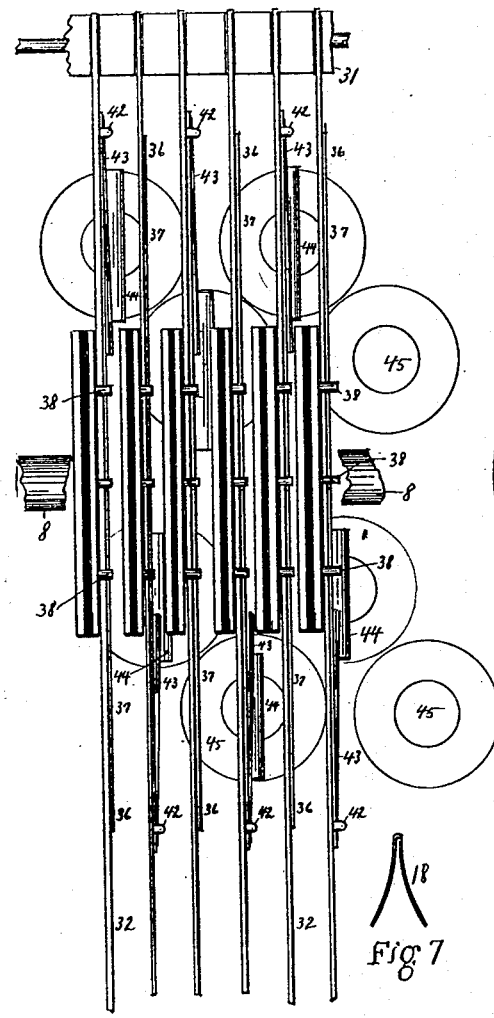
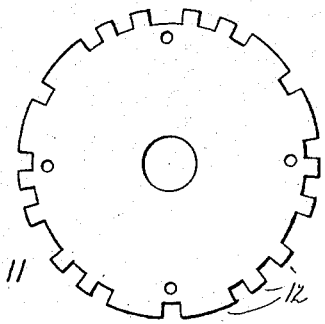
Fig. 4
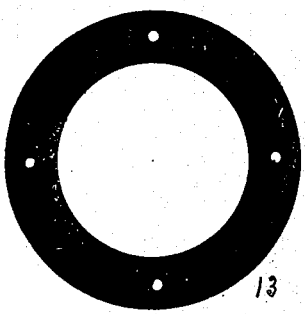
Fig. 5
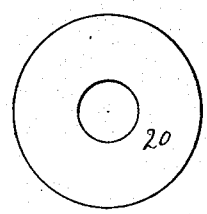
Fig. 6
Fig. 7
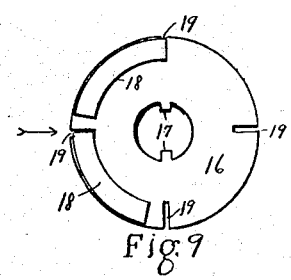
Fig. 8   Fig. 9
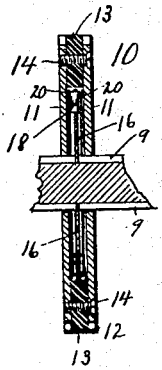
Fig. 10
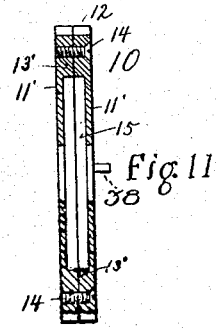
Fig. 11
Witnesses
Inventors

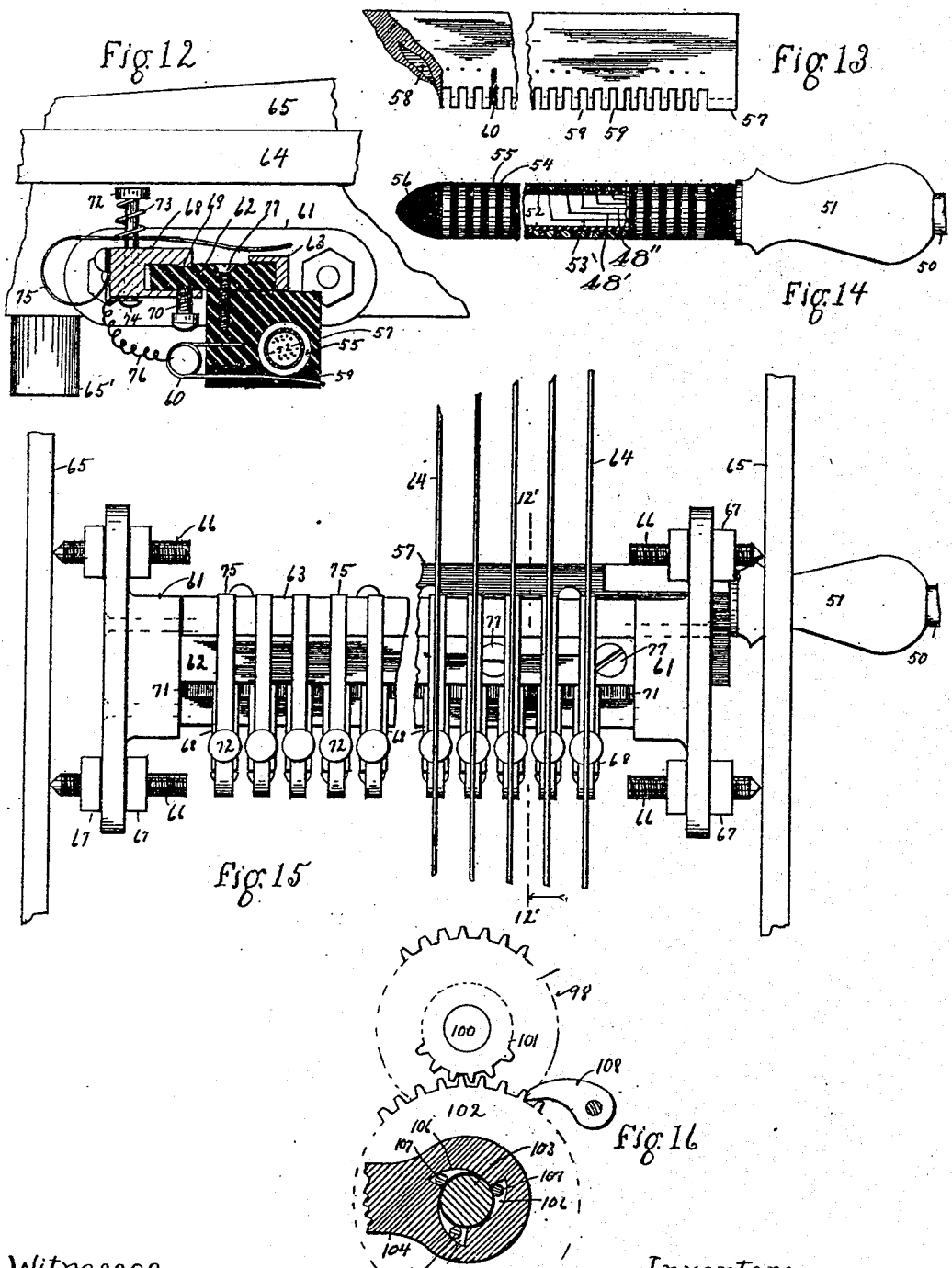

UNITED STATES PATENT OFFICE.

BENJYMAN P. HAYES AND SIGEL H. GILL, OF TOPEKA, KANSAS.

TELEGRAPH-TRANSMITTER.

No. 808,366.  Specification of Letters Patent.  Patented Dec. 26, 1905.

Application filed June 17, 1905. Serial No. 265,706.

*To all whom it may concern:*

Be it known that we, BENJYMAN P. HAYES and SIGEL H. GILL, citizens of the United States of America, residing at Topeka, in the county of Shawnee and State of Kansas, have invented new and useful Improvements in Telegraph-Transmitters, of which the following is a specification.

Our invention relates to mechanical transmitters comprising a series of symbol-disks mounted on a constantly-rotating shaft with a series of keys and key-levers for controlling the symbol-disks to hold them in their normal stationary position or to release them, so they will revolve with the shaft, the rotation of the symbol-disk against a brush causing the make and break in the main line.

The objects of the present invention are to produce a simple and efficient telegraph-transmitter; to produce such a machine in which the several parts are such that they can be made at a minimum cost and yet which are durable and not easily gotten out of order; to provide a simple and efficient, friction-clutch for controlling the symbol-disk by the key; to produce a simple, efficient and practical means for operating the transmitter by the keys of a type-writer, so as to operate the type-writer and the transmitter simultaneously, special attention being given to the particular means and mechanisms employed for this purpose and also special attention being given to the feature of quickly and readily and easily attaching our transmitter to any ordinary type-writer without any alteration of the latter machine.

Other objects will appear hereinafter.

To these ends the invention consists of the parts, improvements, and combinations herein shown and described and claimed.

In the drawings accompanying and forming part of this specification and in the description thereof we have illustrated the invention in its preferred form and have shown the best mode of applying the principles thereof; but it is to be understood that the invention itself is not confined to these drawings and the description of the drawings, that it may be applied to other uses, and that parts and combinations thereof, as herein separately claimed, may be used in connection with other devices of a similar general nature, and that we contemplate changes in form, proportion, material, arrangement, transposition of parts, and equivalent members without departing from the spirit of the invention.

Figure 2:
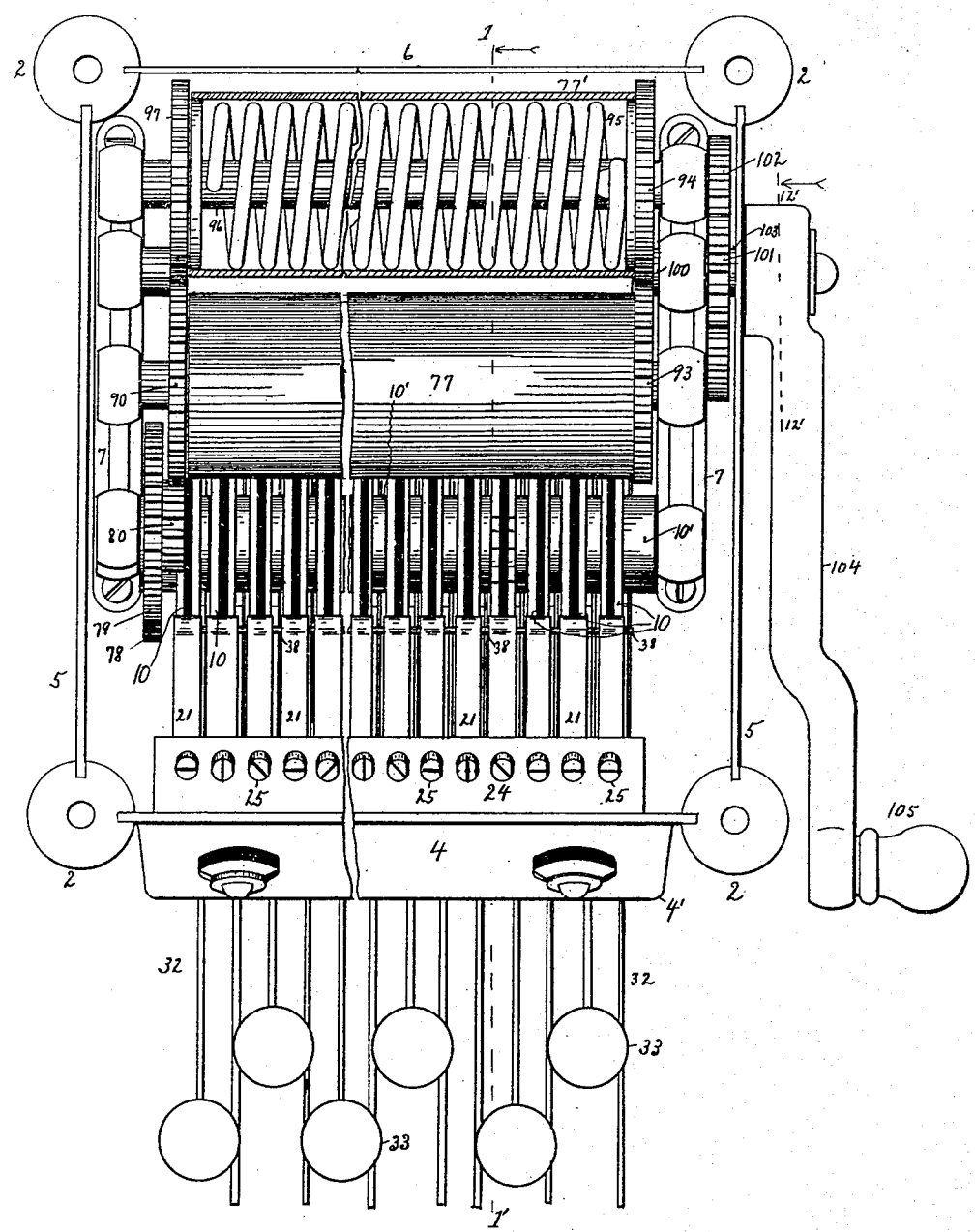

Figure 1 is a vertical section of the transmitter approximately through the line 1' 1', Fig. 2, showing the symbol-disk for the characters denoting the period in the Morse code—namely, two dots, two dashes, and two dots—and also showing part of the type-writer connection. Fig. 2 is a plan view of the transmitter, the top plate of the inclosing frame being removed. Fig. 3 is a plan view intended to show the arrangement of the symbol-disks, the transmitter key-levers, and the electromagnet attachments for operating the disks by the type-writer keys. Figs. 4, 5, 6, 7, 8, 9, and 10 are details of the symbol-disk and the friction-clutch, Fig. 10 being a sectional view of these parts assembled on the driving-shaft. Fig. 11 is an alternative manner of constructing the disk. Fig. 12 is a detail in cross-section through the line 12' 12' of Fig. 15 of the type-writer attachment device. Fig. 13 is a side view of the commutator-bar. Fig. 14 is a side view, but partly in section, of the commutator-jack; and Fig. 15 is a plan view of the attachment device, showing parts of the nether portion of the type-writer frame and several of the type-writer keys. Fig. 16 is a detail of the roller-ratchet mechanism for winding the spring-motor.

Like reference-numerals indicate like or corresponding parts throughout the several views.

1 is the base-plate of the frame. 2 represents the corner-posts. 3 is the top plate. 4 is the front plate, which is bulged at 4' to accommodate the brush-holder 22. 5 5 are the side plates, and 6 is the back plate.

In a bearing-bracket 7 at each end of the machine is mounted a drive-shaft 8, provided throughout its length with one or two keyways 9 9. On the shaft are mounted the symbol-disks 10 10 10, constructed as follows: We make two disks or plates 11 11 of suitable conducting material and divide the periphery into dots and dashes, with air-gaps between to correspond to the characters which the symbol-disk is to represent. The disk shown in detail in the drawings represents the period, and there are three periods on the disk, so that the disk is required to rotate but one-third of a complete circle to transmit that character. It is understood, however, that there may be more or less than three characspirit of the invention, the number to be determined by the size of the disk and the relative lengths of the symbols. The character for the letter "e," for instance, being but a single dot would be repeated several times around the periphery of the "e" disk. We also provide a ring 13, of suitable insulation material, as fiber, and of about the same size as the disks, being just enough smaller to permit perfect contact of the brushes 21 with the metal plates 11 11.

We provide a disk 16 for each symbol-disk. The disk 16 is of a size that will fit in the ring 13 and is provided with lugs 17 17, corresponding with the keyways 9 9 of the drive-shaft, whereby the said disk 16 may be splined onto the drive-shaft by slipping it on at the end. The disk 16 also has the radial slots 19 19, into which are fitted the friction brushes or wings or springs 18, which consist simply of a spring bent upon itself, as shown. These springs tend naturally to extend outwardly. Between the springs and the inside surface of each of the plates 11 is a washer or friction-disk 20 to take up the wear of the brushes. The parts are assembled by placing the ring 13 onto one of the plates 11, then placing within the ring a washer 20, then the clutch 16 with brushes 18 18, then another washer 20, and then the other plate 11, and securing the parts together by suitable means, as by screws 14 14. The whole symbol-disk may then be mounted on the drive-shaft by slipping the shaft through the central opening, with lugs 17 17 in keyways 9 9.

The brush-holder 22 is secured to but insulated, 23, from the front plate 4 of the frame and is provided with a series of brushes 21, preferably one for each symbol-disk, and through the bracket 24 are the adjusting-screws 25 25, the brushes being adapted and adjusted to bear with the desired pressure against symbol-disk, brushes and disks (through drive-shaft and frame) being connected up with opposite main-line wires 28 and 27, respectively. A switch 29 is provided to cut out the machine from the main line, when desired. This switch is simply a metal-lever switch commonly used, consisting of a metal lever or spring pivoted to one post 29" and adapted to be turned onto or off of the other post 28", which two posts are connected up with the main-line wires by the shunt-wires 29' and 28', respectively. When the switch is closed, the main line passes therethrough. When it is opened, the main line passes through the transmitter disks and brushes.

To a slotted fulcrum-block 31 at the rear of the machine are pivoted a series of key-levers 32 32, provided with keys 33 33, one key-lever for each symbol-disk. The levers extend out through slots 34 in the front plate 4 and are held in normally raised position by springs 35 35. On one side of c an auxiliary lever 37, pivoted at 36, the other end 41 working loosely in the cleat 42, fastened to the key-lever 32. The auxiliary is sustained in normally permanent relation with the key-lever by the spring 43 and is notched at 39, so as to engage as a stop the pin 38, extending laterally from the side of the symbol-disk. There are as many pins on each disk as there are characters. Thus in the case illustrated there are three pins and three periods, and they are so arranged that when the shaft is turning in the direction indicated by the arrow a pin 38 will engage notch 39 and hold the symbol-disk stationary with brush 21 on an insulated portion 26, although the friction disk and springs 18 18 rotate with the drive-shaft and within the larger disk. On depressing the key 33, however, the large disk will be permitted to rotate with the drive-shaft and friction-brushes until the key be released, so as to engage a pin 38 with the notch 39. In ordinary sending there would be simply a light quick touch upon the key and its immediate release, which would cause the transmission of a single character; but if desired to repeat that character it is plain that this would be done by holding the key down.

On each auxiliary lever 37 is an armature 44, and under each armature is an electromagnet 45. These magnets, armatures, and auxiliary levers are preferably arranged in mismatched relation, which permits them to be compacted together in comparatively small space, the magnets being sustained on the supporting-plate 46, secured by hangers 47 47 to the base-plate 1. The wires for these magnets are connected up with the type-writer keys corresponding to the symbol-disks, respectively, so that there is a separate circuit for each magnet controlled by its respective type-writer key, although it is plain that a single battery and a common return-wire may be used for all the circuits. Thus the wires 49 48' 48" 48''' are connected through a cable and devices hereinafter explained in detail from one side of said magnets, respectively, to the respective contact-springs 75 75, as explained hereinafter, while the common return-wire 48 connects the other side of all the electromagnets with the universal contact-strip 63, thus making in a well-known manner a number of independent circuits with a common return-wire and operable by a single battery 49'. Preferably we carry these wires in a cable 50, and we will now explain the manner of connecting with the type-writer key-levers.

A cylindrical piece of insulating material 52 is provided with a handle 51, through which the wires 53 (corresponding to the wires 48 49 48', &c.) of the cable 50 extend and on which are mounted alternately rings of conducting and non-conducting material, wires being connected up with the metal rings, respectively. The fiber commutator 57, having the hole 58, is slotted at 59 59 to correspond with the metal rings on the jack just explained, and in each slot is a spring 60, whereby connection is made between the wires and the springs 60 60 by simply inserting the jack in the commutator.

Extending between the end brackets 61 61 is the insulation-bar 62, on which is mounted a contact-strip 63, these parts being adapted to be secured to the side bars 65 65 of the type-writer frame and under the key-levers 64 64 by means of the pointed set-screws 66 66 and lock-nuts 67 67. The bar 62 has grooves 71 above and below. For each key-lever is a bracket 68, having a hook 69 to engage the upper groove and a set-screw 70 to engage the lower groove and hold it in place. A spring-button 72, sustained on a spring 73 and adapted to be moved up and down and limited as to upward movement by a knob 74, controls the contact-spring 75, which is connected by wire 76 to spring 60, as to contact-strip 63. The block 57 may be secured immediately under the bar 62 by screws 77, it being understood that each spring 60 is connected to its proper contact-spring 75 by a wire 76, so that on depressing the type-writer key and key-lever the circuit is closed for the electromagnet controlling the auxiliary lever for the symbol-disk corresponding to that type-writer key. The jack may be removed readily, or the entire attachment may be removed or put on any ordinary type-writer without any alteration of the latter machine. If the type-writer attachment be not used, the auxiliary levers will coöperate with the key-levers 32 as if solid therewith, and if the electromagnet attachment be used the armatures and auxiliary levers 37 will be drawn down, so as to release pins 38 without moving the main transmitter-levers 32, the springs 43 serving to restore and maintain the auxiliary levers in normal position. If it be desired not to have the electromagnet attachment, the auxiliary levers may be dispensed with, the notch 39 being made in the main lever. As it is shown, however, the main lever is cut away at 40 to allow the proper movement of the pins.

A universal stop-bar 82 extends along under the type-writer key-levers and is provided with a handle 81 and is adapted to be shifted to the position 83. (Shown in dotted outline.) In the first position the type-writer keys have a limited movement only sufficient to take up the lost motion without operating the type-bars, but of sufficient range to press contact-spring 75 against contact-strip 63. In the second position of the stop the entire movement of the type-writer key-lever occurs, the additional movement being taken up in the two springs 73 and 75. In the first position only the transmitter is affected by the manipulation of In the second position both machines are operated simultaneously, while if it be desired to operate only the type-writer the transmitter may be wholly disconnected. Obviously, too, the transmitter may be operated without the type-writer by the transmitter-keys.

Any suitable motor may be provided for driving the drive-shaft 8, as an electric motor or a spring-motor, of any suitable construction and with suitable governing devices to drive the shaft at any suitable speed. We have illustrated one kind of motor, a spring-motor, built somewhat on the order of the common curtain-shade roller and comprising a train of three of these rollers or tubes and springs with suitable roller-ratchet for winding it and suitable intermediate gearing.

A large gear 78 is attached to the drive-shaft and meshes with gear 79, which is attached to the smaller gear 80, which meshes with gear 90, keyed to shaft 91, to which is secured one end of the long coil-spring 92, the other end of which is secured to the gear 93. Gear 93 meshes with gear 94, to which is secured one end of coil-spring 95, the other end of which is secured to shaft 96, to which is keyed gear 97, which meshes with gear 98, to which is fastened one end of spring 99, the other end of which is secured to shaft 100, on the other end of which is the smaller gear 101, meshing with the larger gear 102 on shaft 103. The crank 104 has a handle 105 and a number of cam-shaped recesses 106 106 106, in which are the rollers 107 107 107. A detent 108 prevents the springs from unwinding except in turning the shaft. The motor is wound by the operation of the crank. The coil-springs may be inclosed in the tubes 77 77' 77'', respectively.

The washers 10' 10' keep the disks properly spaced apart on the shaft.

Our arrangement of friction-clutch reduces to a minimum the amount of friction necessary in this form of device and also prevents the tendency to throw the disks out of their proper position because of the brushes bearing against opposite faces of the same disk.

What we claim is—

1. In a telegraph-transmitter, the combination of a driving-shaft and a symbol-disk, friction-brushes on opposite sides of the disk and secured to the shaft, and a key and key-lever for controlling the disk.

2. In a telegraph-transmitter, the combination of a drive-shaft, a slotted disk 16, friction-brushes 18, 18 consisting of strips of metal springs bent upon themselves and inserted in said slots, hollow symbol-disks in which said disk 16 and friction-springs are inserted as a friction-clutch, and a key and key-lever for controlling the disk.

3. In a telegraph-transmitter, the combination of the driving-shaft and a symbol-disk carrying the disk with the shaft, a key and key-lever for the disk, an auxiliary lever for said first-mentioned lever pivoted thereto and carrying an armature, said auxiliary lever being adapted to operate with the main lever and also to operate independently thereof, an electromagnet for the armature, a circuit for the electromagnet and a circuit-closer for the circuit.

4. In telegraph-transmitters, the combination with a main lever 32, of an auxiliary lever 37 pivoted thereon and carrying an armature and adapted to operate with the main lever and also independently thereof, an electromagnet for the armature, and a circuit including said electromagnet controlled by the type-writer keys, together with the type-writer having keys and key-levers.

5. The combination with a telegraph-transmitter comprising a drive-shaft, a series of symbol-disks, and electromagnetic controlling devices for said disks respectively; of a type-writer having keys and key-levers; and an attachment device for connecting the transmitter with the type-writer and comprising contacts for each type-writer key respectively for controlling said respective electromagnets, a frame on which said contacts are mounted having the end castings, and the set-screws and lock-nuts for securing said attachment-frame to the frame of the type-writer, substantially as set forth.

6. The combination with a telegraph-transmitter and a type-writer, each provided with a series of keys and key-levers, an electromagnetically-controlled auxiliary lever for each transmitter-lever, a series of circuit-wires for the electromagnets, a circuit-closer operated by each type-writer key for its electromagnet, a jack comprising the alternately-arranged rings of conducting and insulating material, and a socket and springs corresponding to the conducting-rings for connecting the jack and the commutator, substantially as set forth.

7. In telegraph-transmitters, the combination with a type-writer having keys and key-levers and a telegraphic transmitting attachment therefor comprising a shaft and a series of symbol-disks mounted thereon and controlling means for the disks respectively; of a series of electric circuits, one for each symbol-disk, and including an electromagnet to control said disk; an attachment-frame, a common contact-strip thereon and a contact-spring 75 for each type-writer key-lever, for controlling said circuits respectively; a spring-button 72 coöperating with said key-lever and contact-spring; and a stop-bar 82; whereby the transmitter may be operated by the type-writer keys, either simultaneously with the type-writer key-bars, or independently thereof.

In testimony whereof we have hereunto signed our names in the presence of witnesses.

BENJYMAN P. HAYES.
SIGEL H. GILL.

Witnesses:
   Jno. A. Hulit,
   Joseph Groll.